UNITED STATES PATENT OFFICE 2,204,978

METHOD FOR PRODUCING CYCLOHEXANE AND ACETONE

Edward P. Bartlett, Wilmington, Del., assignor to E. I. du Pont de Nemours & Company, Wilmington, Del., a corporation of Delaware No Drawing. Application April 4, 1939, Serial No. 265,932

18 Claims. (Cl. 260—596)

This invention relates to chemical processes of hydrogenation and dehydrogenation and more particularly to a process for the simultaneous catalytic dehydrogenation of isopropanol and catalytic hydrogenation of benzene.

A combined reaction in which isopropanol is dehydrogenated to acetone and benzene hydrogenated to cyclohexane over a suitable catalyst was first suggested by Padoa and Foresti (Atti accad. Lincei Classe sci., fis. mat. nat (5) 23, 84.91 (1914).) The suggestion was supported by certain semi-quantitative experiments conducted at atmospheric pressure with stoichiometrical amounts of isopropanol and benzene.

$$3(CH_3)_2.CHOH + C_6H_6 \rightarrow 2(CH_3)_2CO + C_6H_{12}$$

Acetone was identified in the product. Cyclohexane was not identified, but certain changes in pressure within the reaction flask indicated to the investigators that the formation of some cyclohexane was probable. The authors also calculated by the Nernst heat theorem, the equilibrium constant for the reaction at 185° C.

$$\frac{P^2_{C_3H_6O} \times P_{C_6H_6}}{P^3_{C_3H_8O} \times P_{C_6H_{12}}} = 0.394$$

or as we prefer to express the equilibrium $$\frac{P^3_{C_3H_6O} \times P_{C_6H_{12}}}{P^3_{C_3H_8O} \times P_{C_6H_6}} = 2.54$$

In Table 1 are given equilibrium constants calculated from the most recent thermal data for benzene, isopropanol, cyclohexane and acetone.

TABLE 1

Values of K in

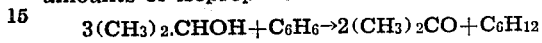

$$K = \frac{P^2_{(CH_3)_2CO} \times P_{C_6H_{12}}}{P^3_{(CH_3)_2CHOH} \times P_{C_6H_6}}$$

| Temperature | Log₁₀K | K |
|---|---|---|
| 100 | 3.579 | 37.93×10³ |
| 150 | 3.273 | 18.74 |
| 200 | 3.027 | 10.65 |
| 225 | 2.930 | 8.52 |
| 250 | 2.849 | 7.07 |
| 300 | 2.676 | 4.74 |
| 350 | 2.559 | 3.62 |
| 400 | 2.449 | 2.81 |
| 500 | 2.319 | 2.09 |

These figures indicate that temperature exerts a relatively small influence on the equilibrium. For instance calculated conversions at 200° and 300° are 85.0% and 82.4% respectively. If the vapors of the constituents act as ideal gases the reaction involves no volume change and hence should not be affected by pressure.

However, we have found that this reaction is not the simple hydrogen exchange reaction implied, but rather two or more separate reactions whose rates may be controlled almost at will by the proper choice of pressure, temperature, and catalyst. In fact, at atmospheric pressure the hydrogenation and dehydrogenation rates involved in the process under discussion, are far from equal. The isopropanol dehydrogenation, at atmospheric pressure, outruns by far the benzene hydrogenation and dehydration of isopropanol becomes a major cause of poor yields.

It is an object of this invention to overcome the disadvantages of the prior art and to combine into one process, which may be of the batch or continuous type, the efficient and commercially practicable catalytic dehydrogenation of isopropanol with concurrent simultaneous catalytic hydrogenation of benzene.

Other objects and advantages of this invention will be apparent from the following specification in which its preferred embodiments and details are described.

According to the present invention a mixture of isopropanol and benzene is caused to react at an elevated temperature and under a pressure in excess of atmospheric in the presence of a catalyst which is active for dehydrogenation as well as for hydrogenation, to produce a mixture of cyclohexane and acetone.

Although temperatures within the range of about 200–300° C. have been found preferable, lower temperatures may also be employed, in fact the lower limit of temperature being actually dependent upon the lowest temperature at which benzene can be hydrogenated. This limit extends to as low as 70° C. Likewise, higher ranges of temperature may be employed if desired, the upper limit of temperature being in fact limited only by the point at which isopropanol decomposes. The temperatures, therefore, extend upward from the lower limit previously stated to temperatures of the order of 350° C., at or above which isopropanol decomposes. In the range of temperatures utilized in operation of this invention I have found that, relatively speaking, the lower the temperature the higher the yield of cyclohexane and acetone, the end products which are the object of the present invention. Inasmuch as acetone and isopropanol are the least stable of the materials utilized or obtained according to the process of the present invention, it is preferable to use temperatures in the lower range of 200 to 300° C.

The critical effect of temperature and pressure upon my process may be better understood if it is first recognized that in my process at least three reactions may occur:

1. $(CH_3)_2.CHOH \rightarrow (CH_3)_2.CO + H_2$
2. $C_6H_6 + 3H_2 \rightarrow C_6H_{12}$
3. $(CH_3)_2.CHOH \rightarrow CH_3.CH:CH_2 + H_2O$ The first of these reactions is favored by low pressure and high temperature, the second by high pressure and low temperature and the third by high temperature and low pressure.

The effect of pressure on the reaction is well illustrated in the results of experiments shown in Table 2. The reaction vessel employed in this study consisted of a vertical tube packed with 8–14 mesh catalyst and brought to reaction temperature by means of an electric furnace. The charge was pumped into the bottom of the tube against nitrogen or hydrogen at the desired pressure. The liquid exit was at the top of the converter and the liquid was withdrawn through a slightly opened valve at such a rate that only dissolved gas accompanied the liquid. Hydrogen is preferred as a confining gas, but nitrogen proved a useful instrument in following the relative rates of the two primary reactions, as hydrogen in the evolved nitrogen was a measure of the excess rate of isopropanol dehydrogenation. While I have described the specific equipment as used in our experimental work, it should be understood that there may be any modification desired of the equipment or catalyst arrangement which provides for a reaction under pressure, whether such pressure be exerted mechanically or by compressed gas and whether the catalyst be in solid, suspended or dissolved form.

TABLE 2

Effect of pressure on the distribution of products

| Catalyst | Pressure atms. | Temp., °C. | Space velocity vol. liq./vol. cat. | Conversion to— | |
|---|---|---|---|---|---|
| | | | | Cyclohexane | Acetone |
| Ni on kieselguhr | 1 | 235 | 1 | 14 | 35 |
| Ni on copper-magnesia | 20.2 | 225 | 2 | 48.4 | 60.5 |
| | 40.7 | 225 | 2 | 44.9 | 48.7 |
| | 68.0 | 225 | 2 | 58.0 | 59.0 |
| | 20.2 | 200 | 2 | 35.4 | 42.7 |
| | 40.7 | 200 | 2 | 42.5 | 39.3 |
| | 68.0 | 200 | 2 | 46.0 | 42.3 |

With increased temperature, other conditions unchanged, the acetone to cyclohexane ratio in the synthesized product increases. This is illustrated by Table 3. It should be noted that between 200° and 250° lie the critical temperatures of acetone and isopropanol. Experiments indicate that any mixture of factors and products likely to be encountered in this reaction is entirely in the vapor phase at 250°. It should be understood, therefore, that both liquid and vapor phase synthesis conditions are comprised within the scope of my invention.

TABLE 3

Effect of temperature

68 ATMS. PRESSURE

| Catalyst | Space velocity vol. liq./vol. cat. | Temp., °C. | Conversion to— | |
|---|---|---|---|---|
| | | | Cyclohexane | Acetone |
| Ni on copper-magnesia | 2 | 200 | 46.0 | 42.3 |
| | 2 | 225 | 58.0 | 59.0 |
| | 2 | 250 | 37.0 | 47.7 |

The ratio between isopropanol and benzene used according to the preferred methods of the present invention are about 3 mols of isopropanol per mol of benzene. Utilizing this molecular ratio the reaction approaches equilibrium with the production of stoichiometric quantities of cyclohexane and acetone. By operating with excess hydrogen, the ratio of cyclohexane to acetone in the product may be increased, and by accepting hydrogen as a by-product the ratio may be decreased.

The known hydrogenation catalysts generally such as nickel, cobalt, iron, manganese, molybdenum, chromium, the noble metals and the like, may be employed in accordance with the present invention. Preferably, however, use is made of those catalytic materials which will favor the dehydrogenation of isopropanol without formation of decomposition products and at the same time the catalysts should preferably be of a type which will exert strong catalytic effect upon the hydrogenation of benzene to cyclohexane. The selection of the catalyst is, therefore, important. I have found that of the hydrogenation metals which also exert a strong dehydrogenation effect, nickel and cobalt are the preferred metals. These metals may be utilized in the metallic state or in the form of their reduced or partly reduced fused oxides and may be used together with known supports such as kieselguhr, mineral silicates, silica gel, porcelain, or other support. Likewise, the combined dehydrogenating and hydrogenating catalysts of the present invention may be promoted with well known promoters such as copper, cobalt, and manganese and may be used combined with these promoters as well as in the form of their alloys with nickel or cobalt or combined with fused nickel or cobalt oxides. A very effective catalyst is reduced nickel deposited on porcelain, promoted with ceria, or reduced nickel on a support made by reducing copper oxide or magnesia promoted copper oxide. Both catalysts at selected temperatures give almost stoichiometrical ratios of cyclohexane and acetone in the product and both catalysts are sufficiently active.

If desired, water or steam may be utilized during the reaction between isopropanol and benzene to control the process more effectively, such, for example, as in the holding up of isopropanol dehydration and, likewise, inert gases such as nitrogen may be utilized if desired, for example, for the purpose of maintaining an elevated pressure upon the system.

Although a continuous one pass process will be described in the following examples, it will be understood that the present process is adaptable either to a batch operation or to a continuous or cyclical operation in which the unconverted reactants are removed from the reaction products and recycled to the original reaction vessel for further conversion to acetone and cyclohexane.

If it is desired to operate the process of the present invention in the liquid phase, it is necessary to maintain a sufficient pressure upon the reaction system at the temperature range of 200 to 300° C., or lower, to maintain the reacting materials in the liquid phase. Preferably, I utilize pressures of above 2 atmospheres. At temperatures below the critical temperatures of the mixture this can be accomplished by the use of an inert gas such as nitrogen (or hyrogen under certain conditions) which may be utilized to create sufficient pressure upon the system to maintain the reacting materials as well as the reaction products essentially in the liquid phase during the reaction. Otherwise, in the vapor phase, although the reaction starts at atmospheric pressure, it has been found that in a closed system the pressure builds up during the reaction to approximately the vapor pressure of the system at completion of the reaction and before cooling of the reaction products. No excess of pressure is necessary if reaction proceeds in the vapor phase, but the ratio of cyclohexane to acetone in the product varies with pressure because of the change, with pressure, in relative ratio of the dehydrogenation of isopropanol and hydrogenation of benzene.

The following examples illustrate preferred methods of operation according to the present invention.

Example I

A liquid mixture of 3 mols isopropanol and 1 mol benzene was continuously passed over a catalyst comprising nickel deposited on a support, in turn comprising a mixture of reduced copper oxide and magnesium oxide at a temperature of 225° C., and under a hydrogen pressure of 300 pounds per square inch, catalyst being disposed in a closed pressure-resistant vessel, furnished with inlet and outlet valves, and the liquid passing therethrough at a rate of 2 volumes of liquid per volume of catalyst per hour. The catalyst was produced by preparing, as a support, a fused mixture of copper and magnesium oxides such as described as a catalyst in copending Serial No. 171,894, and thereafter impregnating this support with fused nickel nitrate. The impregnated support was then reduced with hydrogen up to 450° C. The conversion of isopropanol to acetone was found to be 60.5% and the conversion of benzene to cyclohexane was 48.4%. The yield or number of mols of charge that reacted to form the desired product, i. e., cyclohexane and acetone, divided by the total mols of charge which disappeared, was 94.2%.

Example II

Proceeding as in Example 1 but under a hydrogen pressure of 1000 pounds per square inch, conversion to acetone was found to be 58% and to cyclohexane 59%. Yield was 93.5%.

Example III

Proceeding as in Example 1 but utilizing a catalyst prepared by depositing nickel nitrate on porcelain and thereafter igniting and reducing with hydrogen up to 450° C., utilizing a reaction temperature of 240° C., and a nitrogen pressure of 1000 pounds per square inch, the conversion to acetone was found to be 49.2% and to cyclohexane 48.0%. Yield was 89%.

Example IV

Proceeding as in Example III but utilizing a mixture of 1 mol benzene and 1 mol isopropanol at a temperature of 225° C., conversion to acetone was found to be 35.0% while 11.5% of the benzene was converted to cyclohexane. Yield was 94.3%.

Example V

Proceeding as in Example I but utilizing a reaction temperature of 250° C. and a copper-cobalt catalyst, prepared by fusing a mixture containing 64% copper and 34% cobalt, in form of their oxides, and under a nitrogen pressure of 1000 pounds per square inch, conversion to acetone was 26.9% with 90.3% yield. Conversion to cyclohexane was 19%.

Various changes may be made in the details and methods of the present invention without departing therefrom or sacrificing any of the advantages thereof.

I claim:

1. A process for the simultaneous production of cyclohexane and acetone which comprises reacting isopropanol and benzene at a pressure above atmospheric, at an elevated temperature of at least 70° C., and in the presence of a catalyst which is active for dehydrogenation and hydrogenation.

2. A process for the simultaneous production of cyclohexane and acetone which comprises reacting stoichiometrical quantities of isopropanol and benzene at a pressure above atmospheric, at an elevated temperature of at least 70° C., and in the presence of a catalyst active for dehydrogenation and hydrogenation.

3. A process for the simultaneous production of cyclohexane and acetone which comprises reacting isopropanol and benzene at a pressure above atmospheric, at a temperature in the range of 70 to 350° C. and in the presence of a catalyst active for dehydrogenation and hydrogenation.

4. A process for the simultaneous production of cyclohexane and acetone which comprises reacting stoichiometrical proportions of isopropanol and benzene at a pressure above atmospheric, at a temperature in the range of from 200 to 300° C. and in the presence of a catalyst active for dehydrogenation and hydrogenation.

5. A process for the simultaneous production of cyclohexane and acetone which comprises reacting isopropanol and benzene at a pressure above atmospheric, at an elevated temperature of at least 70° C., and in the presence of a nickel catalyst which is active for dehydrogenation and hydrogenation.

6. A process for the simultaneous production of cyclohexane and acetone which comprises reacting stoichiometrical quantities of isopropanol and benzene at a pressure above atmospherc, at an elevated temperature of at least 70° C., and in the presence of a nickel catalyst active for dehydrogenation and hydrogenation.

7. A process for the simultaneous production of cyclohexane and acetone which comprises reacting isopropanol and benzene at a pressure above atmospheric, at a temperature in the range of 70 to 350° C. in the presence of a nickel catalyst active for dehydrogenation and hydrogenation.

8. A process for the simultaneous production of cyclohexane and acetone which comprises reacting stoichiometrical proportions of isopropanol and benzene at a pressure above atmospheric, at a temperature in the range of from 200 to 300° C. and in the presence of a nickel catalyst active for dehydrogenation and hydrogenation.

9. A process for the simultaneous production of cyclohexane and acetone which comprises reacting isopropanol and benzene at a pressure above atmospheric, at an elevated temperature of at least 70° C., and in the presence of a cobalt catalyst which is active for dehydrogenation and hydrogenation.

10. A process for the simultaneous production of cyclohexane and acetone which comprises reacting stoichiometrical quantities of isopropanol and benzene at a pressure above atmospheric, at an elevated temperature of at least 70° C., and in the presence of a cobalt catalyst active for dehydrogenation and hydrogenation.

11. A process for the simultaneous production of cyclohexane and acetone which comprises reacting isopropanol and benzene at a pressure above atmospheric, at a temperature in the range of 70 to 350° C. and in the presence of a cobalt catalyst active for dehydrogenation and hydrogenation.

12. A process for the simultaneous production of cyclohexane and acetone which comprises reacting stoichiometrical proportions of isopropanol and benzene at a pressure above atmospheric, at a temperature in the range of from 200 to 300° C. and in the presence of a cobalt catalyst active for dehydrogenation and hydrogenation.

13. A process for the simultaneous production of cyclohexane and acetone which comprises reacting isopropanol and benzene at a pressure in excess of two atmospheres, at a temperature in the range of 70 to 350° C., and in the presence of a catalyst which is active for dehydrogenation and hydrogenation.

14. A process for the simultaneous production of cyclohexane and acetone which comprises reacting stoichiometrical quantities of isopropanol and benzene at a pressure in excess of two atmospheres, at a temperature in the range of 70 to 350° C., and in the presence of a catalyst which is active for dehydrogenation and hydrogenation.

15. A process for the simultaneous production of cyclohexane and acetone which comprises reacting isopropanol and benzene at a pressure in excess of two atmospheres, at a temperature in the range of 200 to 300° C., and in the presence of a catalyst which is active for dehydrogenation and hydrogenation.

16. A process for the simultaneous production of cyclohexane and acetone which comprises reacting isopropanol and benzene at a pressure in excess of two atmospheres, at a temperature in the range of 70 to 350° C., and in the presence of a nickel catalyst which is active for dehydrogenation and hydrogenation.

17. A process for the simultaneous production of cyclohexane and acetone which comprises reacting stoichiometrical quantities of isopropanol and benzene at a pressure in excess of two atmospheres, at a temperature in the range of 70 to 350° C., and in the presence of a nickel catalyst which is active for dehydrogenation and hydrogenation.

18. A process for the simultaneous production of cyclohexane and acetone which comprises reacting isopropanol and benzene at a pressure in excess of two atmospheres, at a temperature in the range of 200 to 300° C., and in the presence of a nickel catalyst which is active for dehydrogenation and hydrogenation.

EDWARD P. BARTLETT.

CERTIFICATE OF CORRECTION.

Patent No. 2,204,978.                                                      June 18, 1940.

EDWARD P. BARTLETT.

It is hereby certified that error appears in the printed specification of the above numbered patent requiring correction as follows: Page 1, first column, line 11, for "84.91" read --84-91--; page 2, second column, line 12, for "catalystic" read --catalytic--; page 3, second column, line 39, claim 6, for "atmospherc" read --atmospheric--; and that the said Letters Patent should be read with this correction therein that the same may conform to the record of the case in the Patent Office.

Signed and sealed this 30th day of July, A. D. 1940.

Henry Van Arsdale, (Seal)                                                       Acting Commissioner of Patents.